(12) United States Patent
Qiu et al.

(10) Patent No.: US 8,368,368 B2
(45) Date of Patent: Feb. 5, 2013

(54) SYSTEM AND METHOD FOR IMPROVING INDUCTOR CURRENT SENSING ACCURACY OF A DC/DC VOLTAGE REGULATOR

(75) Inventors: Weihong Qiu, San Jose, CA (US); Chris T. Burket, Huntington Beach, CA (US); Gustavo James Mehas, Sunnyvale, CA (US)

(73) Assignee: Intersil Americas Inc., Milpitas, CA (US)

(*) Notice: Subject to any disclaimer, the term of this patent is extended or adjusted under 35 U.S.C. 154(b) by 932 days.

(21) Appl. No.: 12/329,147

(22) Filed: Dec. 5, 2008

(65) Prior Publication Data

US 2009/0146635 A1 Jun. 11, 2009

Related U.S. Application Data

(60) Provisional application No. 60/992,817, filed on Dec. 6, 2007.

(51) Int. Cl.
*G05F 1/40* (2006.01)
(52) U.S. Cl. ........................................ 323/282; 323/222
(58) Field of Classification Search .................. 323/222, 323/224, 282–290, 272, 275, 277, 266; 361/56, 361/86; 363/50, 98, 56.02, 132
See application file for complete search history.

(56) References Cited

U.S. PATENT DOCUMENTS

| | | | | |
|---|---|---|---|---|
| 5,638,252 A * | 6/1997 | Drab et al. | | 361/321.1 |
| 5,982,160 A * | 11/1999 | Walters et al. | | 323/282 |
| 6,522,087 B1 * | 2/2003 | Lu | | 315/291 |
| 6,879,136 B1 * | 4/2005 | Erisman et al. | | 323/282 |
| 7,345,460 B2 * | 3/2008 | Ma et al. | | 323/283 |
| 7,358,710 B2 * | 4/2008 | Luo et al. | | 323/282 |
| 7,710,748 B2 * | 5/2010 | Young | | 363/37 |
| 2002/0070399 A1 * | 6/2002 | Kitagawa et al. | | 257/296 |
| 2006/0189003 A1 * | 8/2006 | Dougherty et al. | | 438/3 |
| 2007/0241727 A1 * | 10/2007 | Luo et al. | | 323/272 |

OTHER PUBLICATIONS

PCT: Written Opinion of the International Searching Authority of PCT/US2008/085668; International Publication No. WO 2009/076197; Aug. 31, 2009; 4 pages.
PCT: International Search Report of PCT/US2008/085668; International Publication No. WO 2009/076197; Aug. 31, 2009; 4 pages.

* cited by examiner

*Primary Examiner* — Rajnikant Patel
(74) *Attorney, Agent, or Firm* — Howison & Arnott L.L.P.

(57) ABSTRACT

The DC/DC voltage converter comprises at least one switching transistor. An inductor is connected to the at least one switching transistor. A pulse width modulation circuit generates control signals to at least one switching transistor responsive to a current control signal. A current sensor connected in parallel with the inductor senses current passing through the inductor. The sensor comprises a resistor and an NTC capacitor connected in series with the resistor. Circuitry for monitoring the voltage across the NTC capacitor generates the current control signal responsive to the monitored voltage.

16 Claims, 4 Drawing Sheets

CAPACITANCE VS. TEMP

SYSTEM AND METHOD FOR IMPROVING INDUCTOR CURRENT SENSING ACCURACY OF A DC/DC VOLTAGE REGULATOR

CROSS-REFERENCE TO RELATED APPLICATIONS

This application claims benefit of U.S. Provisional Patent Application No. 60/992,817, filed Dec. 6, 2007 and entitled METHOD FOR IMPROVING DCR CURRENT SENSING ACCURACY, the entirety of which is incorporated herein by reference.

SUMMARY

The present invention, as disclosed and described herein, comprises a DC/DC voltage converter. The voltage converter includes at least one switching transistor and an inductor connected to the at least one switching transistor. A pulse width modulation circuit generates control signals to the at least one switching transistor responsive to a current control signal. A current sensor connected in parallel with the inductor senses current passing through the inductor. The sensor comprises a resistor and an NTC capacitor connected in series with the resistor. A circuitry monitors a voltage across the NTC capacitor and generates the current control signal responsive to the monitored voltage.

BRIEF DESCRIPTION OF THE DRAWINGS

For a more complete understanding, reference is now made to the following description taken in conjunction with the accompanying Drawings in which.

DETAILED DESCRIPTION

Figure 1:
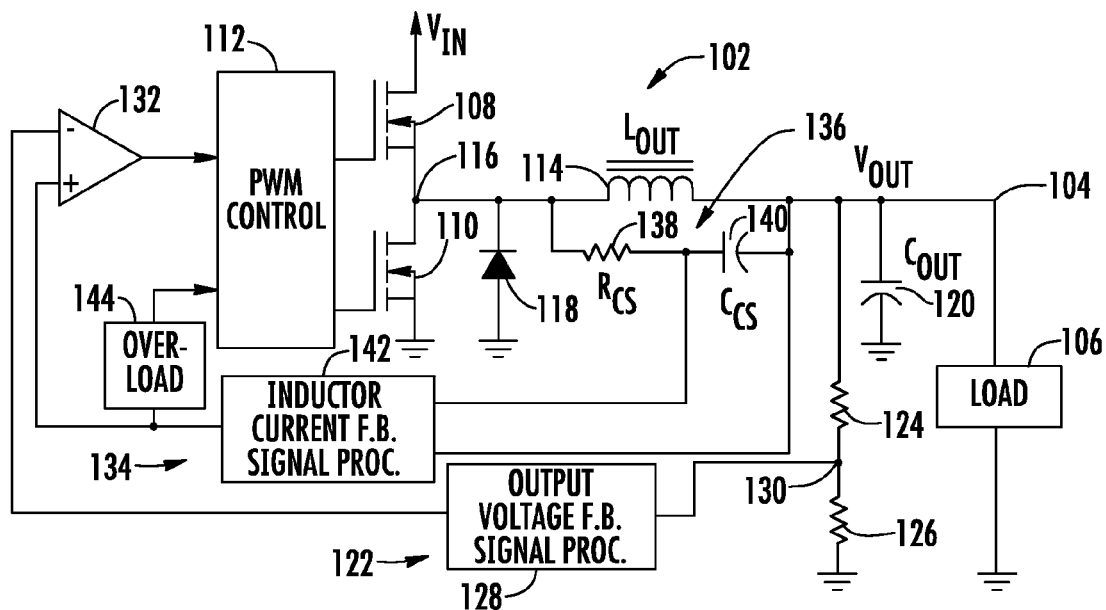
FIG. 1 is a simplified schematic diagram of a DC/DC converter.

Referring now to the drawings, wherein like reference numbers are used herein to designate like elements throughout, the various views and embodiments of this system and method for improving current sensing accuracy through an inductor of a dc/dc voltage regulator are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In power converter designs, the current through an output inductor of the power converter is sensed by current sense circuit for a variety of uses. Uses such as current mode control, over current protection, current sharing and current monitoring require the accurate sensing of the current through the inductor by the current sense circuitry. Existing approaches for measuring the inductor current of the power converter all have their advantages and disadvantages. Some of these methods include using a current sense resistor in series with the output inductor to provide real time accurate current signals with higher costs but lower efficiency. A sense resistor may also be installed on the high-side FET drain of the power converter. However, this current goes to zero volts during the high-side FET "off" stage and makes it difficult to obtain accurate cycle to cycle current information. Another method involves the use of a loss-less RC circuit that is placed in parallel with the inductor and the "lumped" DCR (DC resistance) of the inductor. This method makes use of the respective time constants of these circuits to "pull" inductor current information via the voltage drop across a sensing capacitor.

Referring now to FIG. 1, there is illustrated a simplified schematic diagram of a DC/DC converter 102. This circuit is similar to that disclosed in U.S. Pat. No. 5,982,160, which is incorporated herein by reference. The DC/DC converter 102 provides a controlled voltage $V_{OUT}$ at node 104 to a load 106. The DC/DC converter 102 includes a pair of switching transistors including a high-side switch 108 and a low-side switch 110 connected to receive a source voltage $V_{IN}$. The DC/DC converter 102 in other embodiments may include only the high-side switch 108 with a diode substituted in the position of the low-side switch 110. Additionally, although MOSFET transistors are illustrated, other semiconductor switches may be used as will be understood by one skilled in the art. The DC/DC converter additionally includes an overload detection circuit 144 which uses the sensed current signal from current sensor 136 to prevent overloads.

The high-side switching transistor 108 and low-side switching transistor 110 are provided control signals from a pulse width modulation control circuit 112. The pulse width modulation control circuit 112 generates a series of pulse width modulated control pulses for the high-side switch 108 and low-side switch 110 to regulate the output voltage $V_{OUT}$ coupled to load 106 responsive to a current monitored through an inductor 114.

The output inductor $L_{OUT}$ 114 is connected to the phase node of the DC/DC converter 102 at node 116 between the high-side switch 108 and the low-side switch 110. The inductor 114 is connected between the phase node 116 and the output voltage node 104. A diode 118 is connected between node 116 and ground. An output capacitance $C_{OUT}$ 120 is connected in parallel with the load 106 between the output voltage node 104 and ground.

A voltage regulation loop 122 provides a feedback voltage from the output node $V_{OUT}$ through a resistor divider consisting of a resistor 124 connected in series with a resistor 126 between node 104 and ground. An output voltage feedback signal processor 128 monitors the output voltage from the voltage divider circuit at node 130. The output voltage feedback signal processor 128 provides a feedback voltage signal to an inverting input of comparator 132.

A current control loop 134 provides an input to the non-inverting input of the comparator 132. The current control loop 134 includes a current sensor 136 that is connected in parallel with the output inductor 114 to sense the current passing through the inductor 114. The current sensor 136 consists of a resistor $R_{CS}$ 138 and an NTC capacitor 140 connected together in series. The current sensor 136 provides a current control signal back to the PWM control circuitry 112 through an inductor current feedback signal processor 142 to assist in controlling of the power switches 108 and 110 responsive to a sensed current through the inductor 114.

Figure 2:
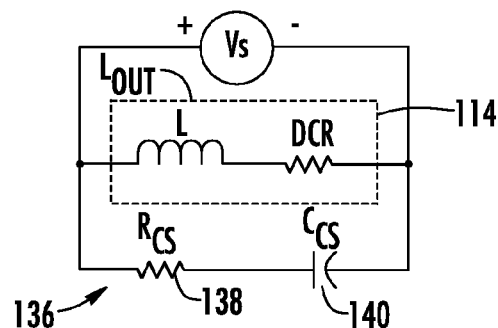
FIG. 2 illustrates a current sensor in parallel with an inductor.

In practice, all inductors include a winding that is a wire, such as copper, that surrounds a magnetic material or air. This wire has a resistance per unit length that leads to a distributed resistance that can be measured as the DC resistance (DCR) of the inductor. A fairly good model of the practical inductor lumps the distributed winding resistance into a single element DCR that is in series with an ideal inductance L as illustrated in FIG. 2. Accordingly the output inductor $L_{OUT}$ 114 of the DC/DC converter 102 can be modeled as having a pure inductance L and a DCR defining a first time constant, $\tau_1$, according to the equation $\tau_1 = L/DCR$. In one embodiment, the resistor $R_{CS}$ 138 and the current sense capacitor $C_{CS}$ 140 of the current sensor 136 in parallel with the inductor 114 define a second time constant, $\tau_2$, according to the equation $\tau_2 = RC$ substantially equal to the first time constant.

By knowing the inductance value of the inductor 114 and measuring the value of DCR, one can select the values of the resistor 138 and current sense capacitor 140 to make $\tau_1$ equal to $\tau_2$. When these two time constants are matched, the average current through the inductor and thus the voltage drive across the inductor's DCR can be accurately measured and provide real time current information within the control loop. When the time constant of the inductor generated by the inductance L and the DCR ($\tau_1 = L/DCR$) matches the time constant of the current sensor 136 ($\tau_2 = R_{CS} \times C_{CS}$), the voltage across the current sense capacitor 140 is equal to the voltage drop across the equivalent DC resistance (DCR) of the inductor 114. This voltage across the capacitor 140 is measured by the inductor current feedback signal processor 142.

However, there are variables that shift the $\tau_1$ and $\tau_2$ timing constants of each of these circuits when in use. Temperature has a major impact on the matching ability of the two time constants. One key factor is an increase in temperature lowers the saturation current capability of the inductor's core material. The saturated core material exhibits a loss of inductance as the current through the inductor is increased. Depending on the application, the value of the inductance can change up to 30% at saturation.

Figure 3B:
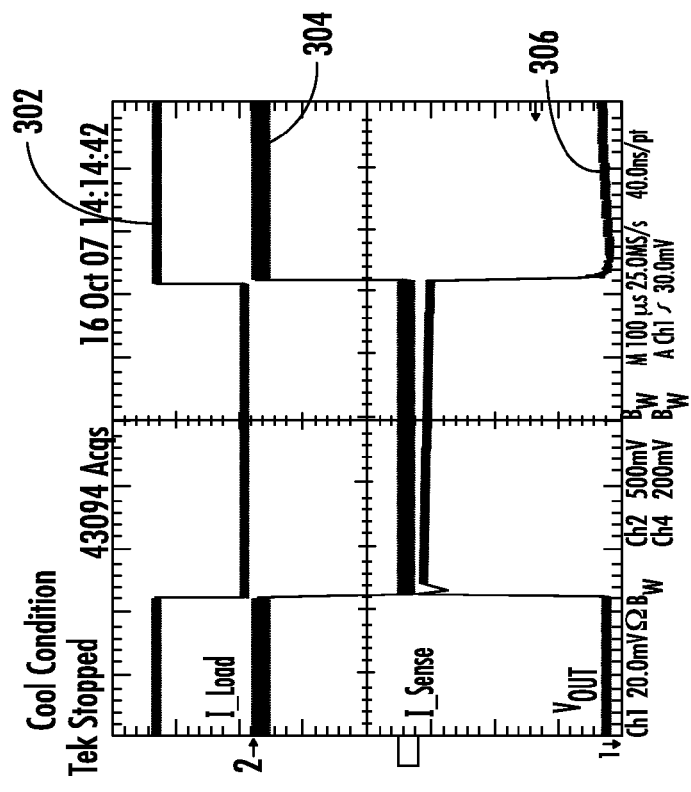
FIGS. 3a and 3b illustrate a sensed current, inductor current and output waveform for the circuit of FIG. 2.
Figure 3A:
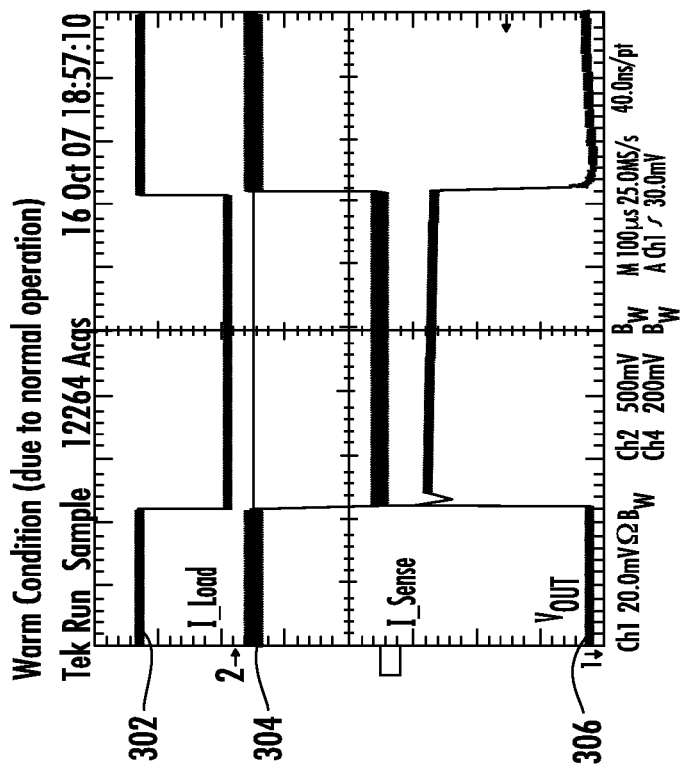

A change of the DCR from room temperature (+25 C) to full load current temperature (+105 C in some cases) can lead to a 32% difference in the series resistance DCR of copper windings and cause a false voltage output level or one that lags behind the current waveform for a finite period of time allowing the output voltage to drop below the allowable minimum for the load 106 due to the impact of these changes on the regulators control response loop. Examples of this are illustrated in FIGS. 3a and 3b. FIGS. 3a and 3b illustrate the traces for the load current 302, the sensed current 304 and the output voltage 306. In FIG. 3a, the operation of these wave forms are illustrated in the warm condition, and in the cool condition in FIG. 3b. Within the cool conditions illustrated in FIG. 3b, the DCR of the inductor is smaller resulting in some overshoot of the output voltage and undershoot due to the relatively short RC time constant within the current sense network. The illustrations in FIGS. 3a and 3b only represent mismatch due to self heating and not due to a full temperature range that the circuit would typically operate within.

When utilizing standard RC components for the current sensor 136, variations in the RC time constant, $\tau_2$, due to changes in temperature caused by changes in the resistive impedance of the inductor and the inductive impedance of the inductor, can arise. As typically implemented, the RC time constant's ($\tau_2$) change with temperature does not match the $\tau_1$ time constant L/DCR temperature change characteristic, resulting in both an AC and DC mismatch in the monitored current data. A DC mismatch is compensated for with well known techniques. However, these techniques do not compensate for AC changes.

AC mismatch results in decreased over current protection accuracy, poor loop performance due to incorrect current information in current mode loops, decreased under voltage protection, and decreased measurement accuracy in digital regulators. Prior attempts have attempted to resolve the AC mismatch problem using thermisters for the resistor 138. However, the cost of NTC thermisters can be prohibitive as they are approximately $0.05 per part. Thermister based designs are also less than optimal as the NTC thermisters are not linear as the L/DCR quotient variation.

Taking all variables into consideration, the L/DCR time constant value can change dramatically during normal operation. As the DCR value changes, it will have two major effects. If the DCR value increases, causing L/DCR to be less than R×C ($\tau_1 < \tau_2$), then the voltage across the capacitor 140 will be lower than the voltage drop across the inductor's DCR and the regulated response will be slow and potentially cause a low $V_{OUT}$ scenario (UVP) (i.e., an under voltage fault condition on $V_{OUT}$). Within the second condition, where DCR has decreased from the nominal value causing L/DCR to be greater than R×C ($\tau_1 > \tau_2$). This creates a scenario wherein the voltage across the capacitor 140 is larger than the voltage drop across the inductor's DCR creating a need for more current to be put through the inductor 114. This causes a potential situation where the inductor current spikes up and may cause a false trigger on the over current protection circuitry.

Figure 4:
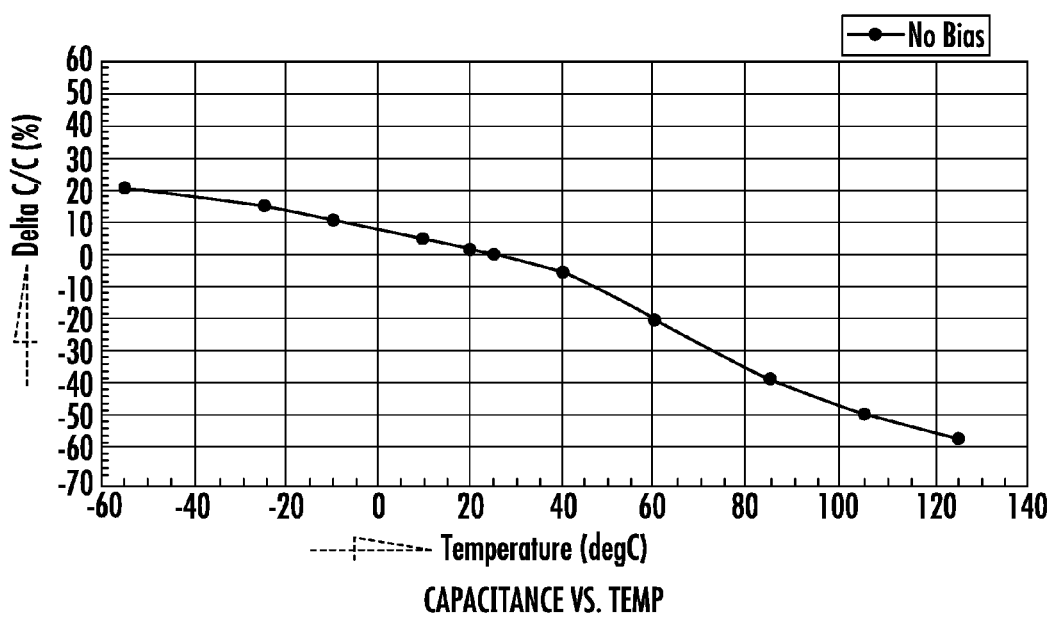
FIG. 4 illustrates a negative temperature coefficient for an NTC capacitor.

By using an NTC capacitor for capacitor 140, a negative temperature coefficient is achieved as illustrated in FIG. 4 such that the capacitance drops when the temperature increases. The NTC capacitor demonstrates a more linear response to temperature than current NTC thermisters. In an alternative embodiment, a PTC capacitor could be used if the resistance had the opposite temperature characteristics of copper. The characteristics of the NTC capacitor can be used to match the inductor's DCR temperature characteristics. By careful design of the NTC capacitor temperature coefficient, the time constant RC provided by the current sensor 136 will match the time constant L/DCR of the inductor under all operational temperatures. The NTC capacitors provide a number of advantages over the use of NTC thermisters since they have a very stable temperature coefficient of approximately −4000 ppm (or greater if needed) and are of significantly lower cost (approximately $0.015). This cost savings is especially pronounced for multiphased designs wherein an NTC thermister would be required for each phase.

The NTC capacitor 140 reduces/cancels the time constant mismatching for all operational temperatures. The NTC capacitor 140 yields a negative temperature coefficient so that the capacitance of the capacitor 140 drops as the temperature increases. The NTC capacitor 140 demonstrates a more linear response to temperature and requires the resistance 138 to set the time constant $\tau_2$ for the current sensor 136. The temperature characteristics of the NTC capacitor 140 can be used to match the inductor's DCR temperature characteristics. By careful design of the NTC capacitor temperature coefficient, the time constant RC will match the time constant L/DCR under all operational temperatures.

When only considering DCR variation, the L/DCR quotient has a roughly +4000 ppm variability with temperature due to the increase in copper winding resistance. The proposed external NTC capacitor would, at a minimum, require this magnitude of linear variation. In actual practice, the coefficient will need to be higher to compensate for the second order effects such as a decrease in the inductive impedance of temperature and due to temperature gradients where the temperature of the capacitor was slightly different than the temperature in the inductor.

Figure 5:
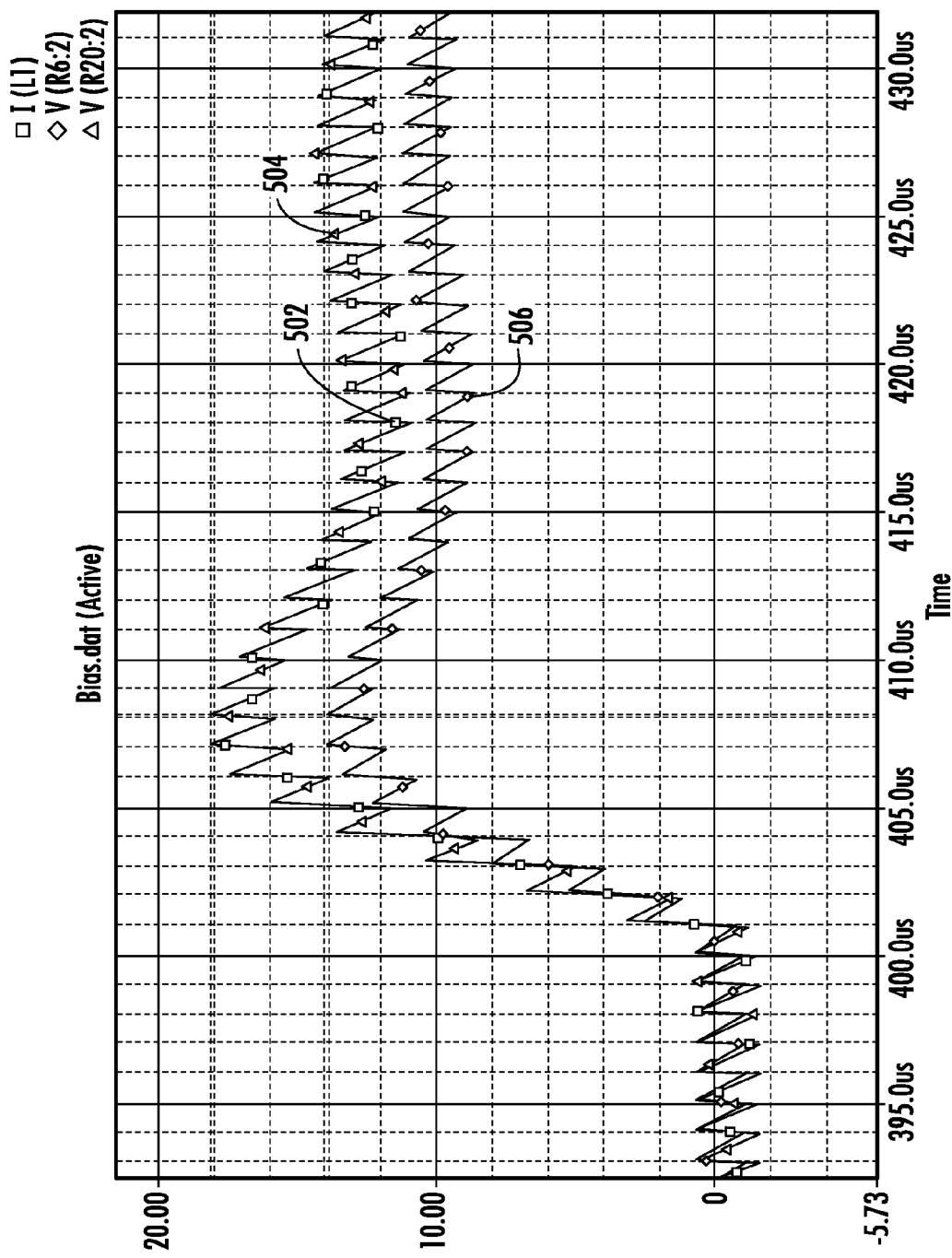
FIG. 5 illustrates current waveforms for a lumped DCR inductor, a current sensor using an NTC capacitor and a current sensor not using an NTC capacitor.

Over a full temperature variation, a mismatch in current measurement can be 22% or greater as illustrated in FIG. 5.

These variations are dependent upon the temperature variability of the inductive impedance of the inductor which varies from manufacturer to manufacturer. FIG. 5 illustrates a current wave form 502 for the lumped DCR inductor (represented by squares), the wave form 504 for the current sensor using the NTC capacitor (represented by an upside down triangle) and the waveform 506 for a current sensor not using an NTC capacitor (represented by a diamond). The AC wave form with a matching capacitor that is an NTC capacitor is indistinguishable from the lumped DCR voltage drop. This simulation assumes that the DC component is compensated for using normal compensation techniques.

The use of an NTC capacitor 140 within the current sensor 136 solves a number of problems within the current sensor. First, the solution provides a matched time constant so that rapid changes in the load current can be acted upon for protecting circuit components (for example, an OCP event), accurately monitors the efficiency of the current through the inductor and when used as an input to a control loop, improves transient response. Additionally, the solution provides a current sensor having much better linearity as compared to a current sensor using a thermister whose NTC has a much more non linear response as compared to an NTC capacitor. Finally, the solution provides a current sensor having a significantly lower cost as compared to a thermister solution given that the standard capacitor having a cost of approximately $0.002 is replaced with a new NTC capacitor having a cost of approximately $0.015 which provides a negligible cost impact when compared to the use of a current sensor including a thermister having a cost of approximately $0.05.

It will be appreciated by those skilled in the art having the benefit of this disclosure that this system and method for improving current sensing accuracy through an inductor of a dc/dc voltage regulator provides a current sensor using an NTC capacitor that more accurately measures currents through an inductor. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A DC to DC voltage converter, comprising:
   at least one switching transistor;
   an inductor connected to the at least one switching transistor, the inductor having a DC resistance associated therewith that varies with temperature;
   a pulse width modulation circuit for generating control signals to the at least one switching transistor responsive to a current control signal;
   a current sensor connected in parallel with the inductor for sensing current passing through the inductor, said sensor further comprising:
      a resistor;
      an NTC (negative temperature coefficient) capacitor connected in series with the resistor for compensating for changes in the DC resistance of the inductor responsive to temperature changes, wherein the NTC capacitor has −4000 ppm or greater of linear variation with respect to temperature;
   circuitry for monitoring a voltage across the NTC (negative temperature coefficient) capacitor and generating the current control signal responsive to the monitored voltage.

2. The DC to DC voltage converter of claim 1, wherein the inductor further comprises an inductance and a direct current (DC) resistance defining a first time constant.

3. The DC to DC voltage converter of claim 2, wherein the resistor and the NTC capacitor define a second time constant that is substantially equivalent to the first time constant over substantially all operating temperatures responsive to changes in a capacitive value of the NTC capacitor.

4. The DC to DC voltage converter of claim 2, wherein the resistor and the NTC capacitor define a second time constant that substantially reduces mismatching between the first time constant and the second time constant over substantially all operating temperatures responsive to changes in a capacitive value of the NTC capacitor.

5. The DC to DC voltage converter of claim 1, wherein a capacitance of the NTC capacitor decreases responsive to a temperature increases.

6. The DC to DC voltage converter of claim 1, wherein the NTC capacitor provides for compensation of AC mismatch when measuring the current through the inductor.

7. A DC to DC voltage converter, comprising:
   at least one switching transistor;
   an inductor connected to the at least one switching transistor, said inductor having an inductance and a direct current (DC) resistance defining a first time constant;
   a pulse width modulation circuit for generating control signals to the at least one switching transistor responsive to a current control signal;
   a current sensor connected in parallel with the inductor for sensing current passing through the inductor, said sensor further comprising:
      a resistor;
      an NTC (negative temperature coefficient) capacitor connected in series with the resistor for compensating for changes in the DC resistance of the inductor responsive to temperature changes, wherein the NTC (negative temperature coefficient) capacitor has −4000 ppm or greater of linear variation with respect to temperature;
      wherein the resistor and the NTC (negative temperature coefficient) capacitor define a second time constant that substantially reduces mismatching between the first time constant and the second time constant over substantially all operating temperatures responsive to changes in a capacitive value of the NTC capacitor;
   circuitry for monitoring a voltage across the NTC capacitor and generating the current control signal responsive to the monitored voltage.

8. The DC to DC voltage converter of claim 7, wherein the resistor and the NTC capacitor define the second time constant that is substantially equivalent to the first time constant over substantially all operating temperatures responsive to changes in a capacitive value of the NTC capacitor.

9. The DC to DC voltage converter of claim 7, wherein a capacitance of the NTC capacitor decreases responsive to a temperature increases.

10. The DC to DC voltage converter of claim 7, wherein the NTC capacitor provides for compensation a AC mismatch when measuring the current through the inductor.

11. A current sensor for sensing a current passing through an inductor, said sensor comprising:
   a resistor;

an NTC (negative temperature coefficient) capacitor connected in series with the resistor for compensating for changes in the DC resistance of the inductor responsive to temperature changes, wherein the NTC capacitor has −4000 ppm or greater of linear variation with respect to temperature; and wherein the resistor and the capacitor are connected in parallel with the inductor.

12. The current sensor of claim 11, wherein the inductor further comprises an inductance and a direct current (DC) resistance defining a first time constant.

13. The current sensor of claim 12, wherein the resistor and the NTC capacitor define the second time constant that is substantially equivalent to the first time constant over substantially all operating temperatures responsive to changes in a capacitive value of the NTC capacitor.

14. The current sensor of claim 12, wherein the resistor and the NTC capacitor define a second time constant that substantially reduces mismatching between the first time constant and the second time constant over substantially all operating temperatures responsive to changes in a capacitive value of the NTC capacitor.

15. The current sensor of claim 11, wherein a capacitance of the NTC capacitor decreases responsive to a temperature increases.

16. The current sensor of claim 11, wherein the NTC capacitor provides for compensation a AC mismatch when measuring the current through the inductor.

* * * * *